(12) United States Patent
Stofan et al.

(10) Patent No.: US 8,763,940 B2
(45) Date of Patent: Jul. 1, 2014

(54) MEDIA STORAGE PHYSICAL DESTRUCTION TOOL AND METHOD

(71) Applicant: Garner Products, Inc., Roseville, CA (US)

(72) Inventors: Ronald Stofan, Folsom, CA (US); Jason McMillen, Folsom, CA (US); Ryan Moore, Sacramento, CA (US)

(73) Assignee: Garner Products, Inc., Roseville, CA (US)

( * ) Notice: Subject to any disclaimer, the term of this patent is extended or adjusted under 35 U.S.C. 154(b) by 0 days.

(21) Appl. No.: 14/019,173

(22) Filed: Sep. 5, 2013

(65) Prior Publication Data

US 2014/0001295 A1     Jan. 2, 2014

Related U.S. Application Data

(60) Provisional application No. 61/743,628, filed on Sep. 6, 2012.

(51) Int. Cl.
*B02C 18/02*       (2006.01)

(52) U.S. Cl.
USPC .............................. 241/30; 241/270; 241/283

(58) Field of Classification Search
CPC .. B02C 2018/0015; B02C 18/02; B02C 18/04
USPC .......... 241/94, 95, 270, 283, 274, 30; 100/94, 100/98 R
See application file for complete search history.

(56) References Cited

U.S. PATENT DOCUMENTS

2007/0147776 A1 * 6/2007 Ito .................................. 386/94

FOREIGN PATENT DOCUMENTS

DE           10061321 A1 * 6/2002
JP           2009-146546     * 7/2009

* cited by examiner

*Primary Examiner* — Mark Rosenbaum
(74) *Attorney, Agent, or Firm* — Heisler & Associates

(57) ABSTRACT

An upper plate is spaced from a lower plate by a gap. Teeth extend from a lower surface of the upper plate toward the lower plate. The gap between the upper plate and the lower plate has a first size larger than a second size with the gap adjustable in height between the first size and the second size. Media storage items can be placed within the gap. A compression force is applied to move the plates toward each other and drive the teeth into the item. Preferably, relief holes are provided in the lower plate aligned with the teeth extending from the upper plate so that the teeth can entirely penetrate the item to be destroyed within the gap. Preferably, teeth also extend up from the lower plate. Guards associated with each plate sheath the teeth until the teeth extend into the gap for item destruction.

27 Claims, 5 Drawing Sheets

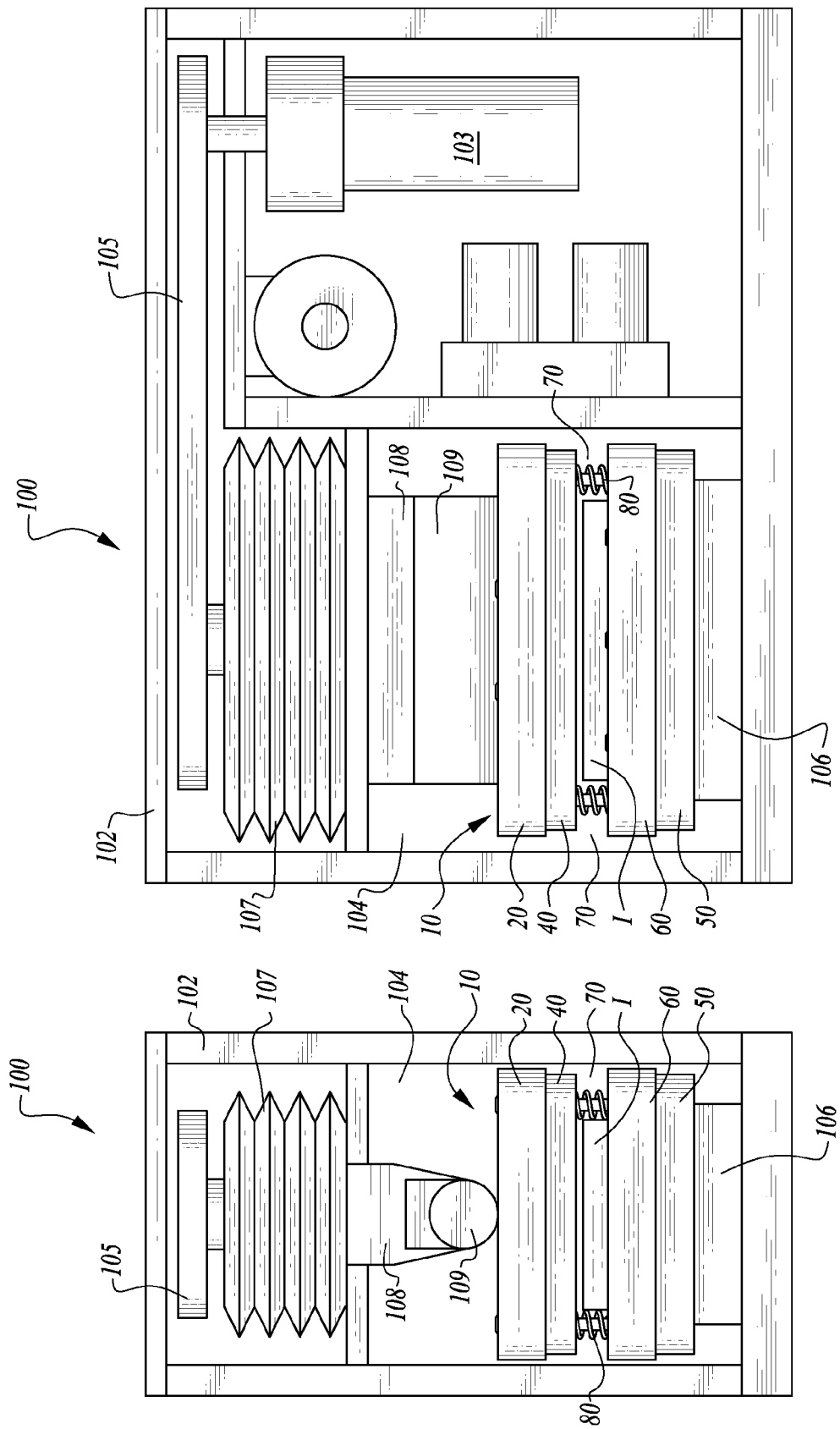

MEDIA STORAGE PHYSICAL DESTRUCTION TOOL AND METHOD

CROSS-REFERENCE TO RELATED APPLICATIONS

This application claims benefit under Title 35, United States Code §119(e) of U.S. Provisional Application No. 61/743,628 filed on Sep. 6, 2012.

FIELD OF THE INVENTION

The following invention relates to tools and methods for physical destruction of media storage devices. More particularly, this invention relates to tools and methods for destruction of solid state memory, typically in the form of integrated circuit chips mounted upon printed circuit boards or other support structures for physical destruction of the item, such that media stored thereon is not retrievable.

BACKGROUND OF THE INVENTION

In a variety of circumstances it is desirable to erase media storage devices, such as hard disks, flash drive memory devices, and other forms of computer memory devices. For instance, when an electronic device has exceeded its useful life and is to be recycled, resold or otherwise decommissioned, it is desirable that the data stored on any media storage devices be erased sufficiently so that no unauthorized individuals have access to the data on such devices.

Some memory devices store data in the form of static charge or otherwise through the physical state of the device. For instance, one class of memory device referred to as a "flash drive" or as "flash memory," stores data as static charge on a particular type of integrated circuit chip configured to store such information. Relatively large quantities of information can be stored on such flash memory devices. In some instances, personal computers have flash memory storage in place of a hard disk. In other instances, flash memory is provided in addition to a hard disk and utilized for storage of data or other media which is most optimally stored on a flash drive rather than on a hard disk.

Such flash memory devices also include what are commonly referred to as "thumb drives" which typically have a USB port on one end thereof and can be plugged into a USB slot on a computer and are powered through the USB interconnection from the computer to allow for data to be retrieved from and stored on such a thumb drive. Other forms of solid state data storage on integrated circuits exist or may be developed in the future, which store data in a manner other than magnetically, and on integrated circuits or other circuitry. Furthermore, a variety of different electronic circuits are provided on printed circuit boards, or other structures where surface mount technology or other technology is utilized to have various circuitry placed upon such a board or other support structure. In some instances, it is desirable that such circuitry, including integrated circuit chips and other semiconductor devices be made inoperable before being disposed of through recycling or other decommissioning A need exists for devices which can effectively and reliably destroy such circuitry, such that a high reliability is provided that data provided on the circuitry, or operability of this circuitry has been completely destroyed.

SUMMARY OF THE INVENTION

With this invention a media storage physical destruction tool is provided which acts on the media storage item to crush the media storage item sufficiently that media or other data stored thereon can no longer be read. The tool includes two plates including an upper plate and a lower plate, spaced apart by a gap. Teeth extend from a lower surface of the upper plate and into this gap. The gap is sized large enough so that media storage items (e.g. flash drives or printed circuit boards having non-volatile memory storage integrated circuits and other storage devices mounted thereon) can slide into this gap between the upper plate and the lower plate. The gap is adjustable in size between a first larger size and a second smaller size. Thus, after the item to be destroyed has been placed into the gap while the gap is in the first larger size, a force is applied to cause the gap to be reduced to the smaller second size, driving the teeth into the item to be destroyed and physically destroying the item.

In a preferred embodiment the upper plate is in the form of a drive platen of substantially planar form oriented parallel with a base platen defining a preferred form of lower plate. In this preferred embodiment the teeth are in the form of destruction pins extending from the lower surface of the drive platen and toward the base platen. Most preferably, the base platen also includes teeth, preferably also in the form of destruction pins, extending up into the gap and toward the upper platen.

Relief holes are preferably provided in the platens or other plates opposite the platens or other plates which have destruction pins or other teeth extending therefrom. These relief holes are positioned so that when the gap transitions from a first larger size to a second smaller size, the second smaller size can actually be shorter than a length of the destruction pins or other teeth so that they extend entirely through the gap and at least partially into the relief holes. Such spanning of the gap ensures that full penetration of the item to be destroyed is achieved, for optimal destruction.

The destruction pins or other teeth are preferably arrayed in a two-dimensional array extending from the lower surface of the drive platen or other upper plate. Thus, a surface of destruction pins or other teeth are presented facing the gap to provide an area of destruction within the gap. This area of destruction is sized to be at least as large as items for which the tool is configured, so that full destruction of the item can be achieved. The drive platen and base platen or other plates are preferably biased away from each other, such as by a plurality of gap springs near corners of the platens or other plates. The gap is thus presented in its first larger size except when a collapsing destructive force is applied between the platens or other plates to close the gap and drive the destruction pins or other teeth through the gap and through the item to be destroyed.

Preferably, each of the platens or other plates also has a guard associated therewith. These guards reside within the gap and are coupled to the associated platen or other plate. Each guard is preferably in the form of a substantially planar surface substantially parallel to the platen or other plate with which it is associated. The guards are preferably movably coupled to their associated platen or other plate and have a plurality of holes therethrough. A first position for each guard covers the destruction pins or other teeth and a second position closer to the associated platen or other plate allows the pins to pass through holes in the guard and extend into and through the gap between the platens or other plates. The guards thus keep the destruction pins or other teeth effectively "sheathed" and protected before the destruction procedure, but allow the destruction pins or other teeth to impact the item to be destroyed when the tool is operated.

In an alternative embodiment, the teeth are in the form of ribs with an elongate form extending substantially parallel with a lower surface of the upper plate. Preferably, the lower plate has channels which are aligned with the ribs. The channels and ribs face the gap and an item to be destroyed is inserted into the gap. A compression force is then applied, driving the ribs down into the gap, and causing portions of the item to be destroyed to be pushed down into the channels beneath each rib. Conceivably the gap could be closed sufficiently so that portions of the ribs extend at least partially into the channels in the lower plate to ensure destruction of items between the upper plate and lower plate. Such an embodiment would also typically have springs or other biasing members spanning the gap or otherwise biasing the gap toward a first larger size until compression forces are applied sufficient to overcome this bias and transition the gap to its second smaller size.

OBJECTS OF THE INVENTION

Accordingly, a primary object of the present invention is to provide a tool for physical destruction of media storage devices such as flash memory or other solid state non-volatile memory devices.

Another object of the present invention is to provide a physical destruction tool which is configured to physically break items placed into a gap thereof.

Another object of the present invention is to provide a tool which reliably destroys media storage devices of a non-magnetic variety.

Another object of the present invention is to provide a media storage physical destruction tool which drives destruction pins in close proximity to each other down through the media storage device with sufficient force to break integrated circuit devices placed into the tool.

Another object of the present invention is to provide a machine which includes a chamber for housing a media storage physical destruction tool therein, and which machine applies a compression force to the media storage physical destruction tool to cause it to crush and destroy media storage devices placed therein while also containing the destruction procedure.

Another object of the present invention is to provide a method for physical destruction of media storage devices.

Another object of the present invention is to provide a method for physically destroying non-volatile memory devices and associated electronic circuitry to render such devices inoperable and with media stored thereon unretrievable.

Other further objects of the present invention will become apparent from a careful reading of the included drawing figures, the claims and detailed description of the invention.

BRIEF DESCRIPTION OF THE DRAWINGS

FIG. 5 is a side elevation view of a machine for applying compression forces to the destruction press tool of this invention.

FIG. 6 is a front elevation view of that which is shown in FIG. 5.

DESCRIPTION OF THE PREFERRED EMBODIMENT

Figure 1:
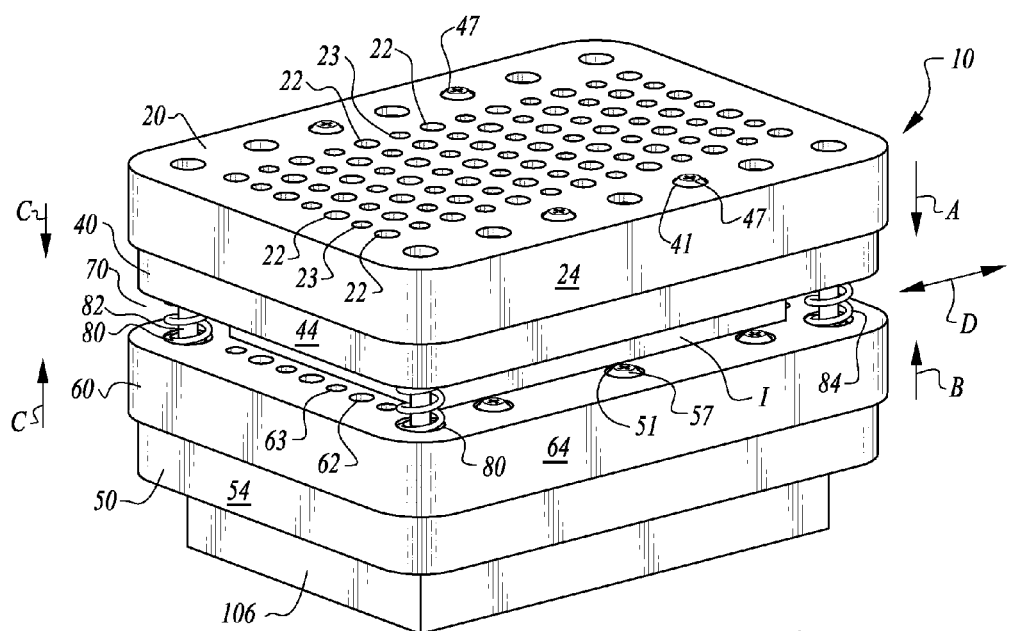
FIG. 1 is a perspective view of a destruction tool according to a preferred embodiment of this invention and with an item to be destroyed located within a gap thereof.

Referring to the drawings, wherein like reference numerals represent like parts throughout the various drawing figures, reference numeral 10 (FIG. 1) is directed to a destruction press tool for destruction of media storage items I placed within a gap 70 of the tool 10. The items I are physically destroyed by having plates such as platens 20, 50 compressed together (along arrow C of FIGS. 1-4 and 8) to drive teeth such as destruction pins 30 into the item I, causing its physical destruction.

In essence, and with particular reference to FIG. 1, basic details of the tool 10 are described, according to a preferred embodiment. The tool 10 includes a pair of plates including a drive platen 20 and a bottom platen 50. These platens 20, 50 are spaced apart by a gap 70. Destruction pins 30 provide a preferred form of teeth extending down from the drive platen 20 toward the base platen 50 and into the gap 70. Preferably, destruction teeth 30 also extend up from the base platen 50 toward the drive platen 20 and into the gap 70. Gap springs 80 bias the drive platen 20 and base platen 50 away from each other and maintain the gap 70 in a first larger size until compression forces cause the gap 70 to be reduced to a second smaller size.

Preferably, a top guard 40 is associated with the drive platen 20 and a bottom guard 60 (defining one form of lower guard) is associated with the base platen 50. The top guard 40 is movably attached to the drive platen 20 and biased toward a position extending away from the drive platen 20 and covering the destruction pins 30 extending from the drive platen 20. The top guard 40 has a plurality of primary holes 42 therein sized to allow the destruction pins 30 of the drive platen 20 to extend down through the top guard 40 when the top guard 40 is pushed toward the drive platen 20. Secondary holes 43 in the top guard 40 accommodate destruction pins 30 extending up from the base platen 50 when the gap size is reduced during the destruction process. Similarly, the bottom guard 60 has primary holes 62 for allowing destruction pins 30 of the base platen 50 to extend upward therethrough, but which destruction pins 30 are covered by the bottom guard 60 until the destruction procedure begins. Secondary holes 63 in the bottom guard 60 accommodate the destruction pins 30 extending down from the drive platen 20. Each of these guards 40, 60 are biased, such as through a spring, toward a position extending away from the associated platen 20, 50, but can move toward the associated platen 20, 50 when the springs 46, 56 are compressed. A machine 100 is also provided into which the destruction press tool 10 can be placed. The machine 100 is configured to have a force applicator to apply a compression force on the platens 20, 50 or other plates to close the gap in which an item I to be destroyed is located, and to cause the destruction pins 30 or other teeth to penetrate and destroy the item I.

Figure 2:
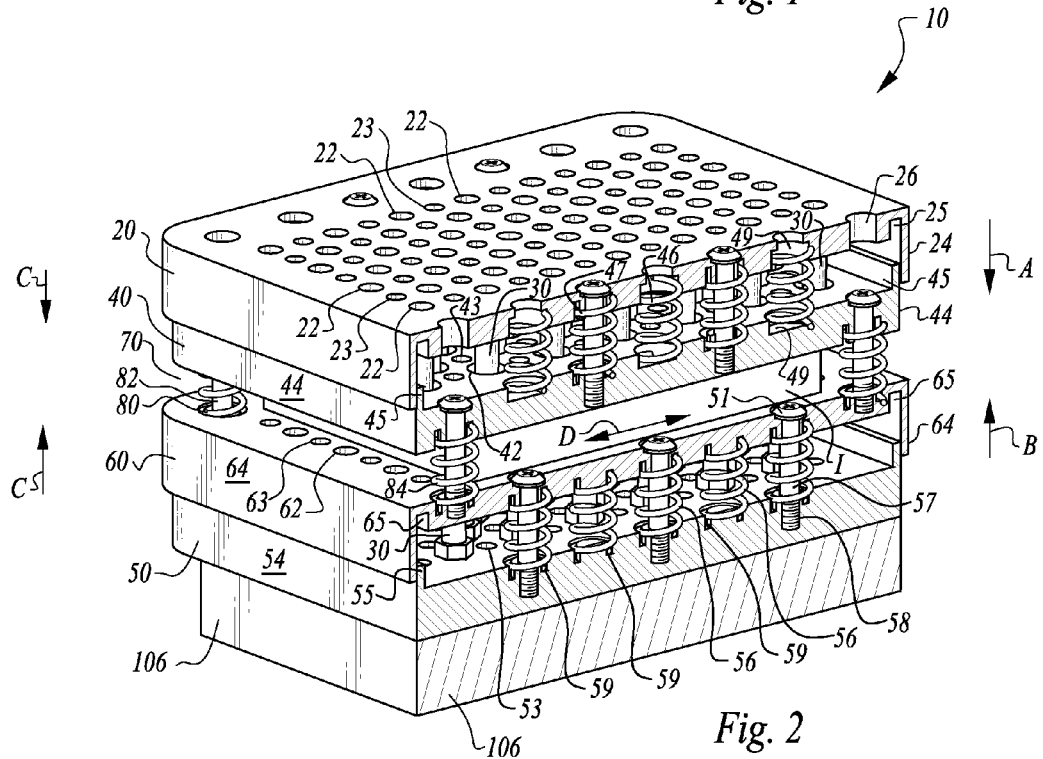
FIG. 2 is a perspective view similar to that which is shown in FIG. 1, but with portions thereof cut away through a plane aligned with guide posts and springs which hold a top guard and bottom guard adjacent a drive platen and base platen.
Figure 3:
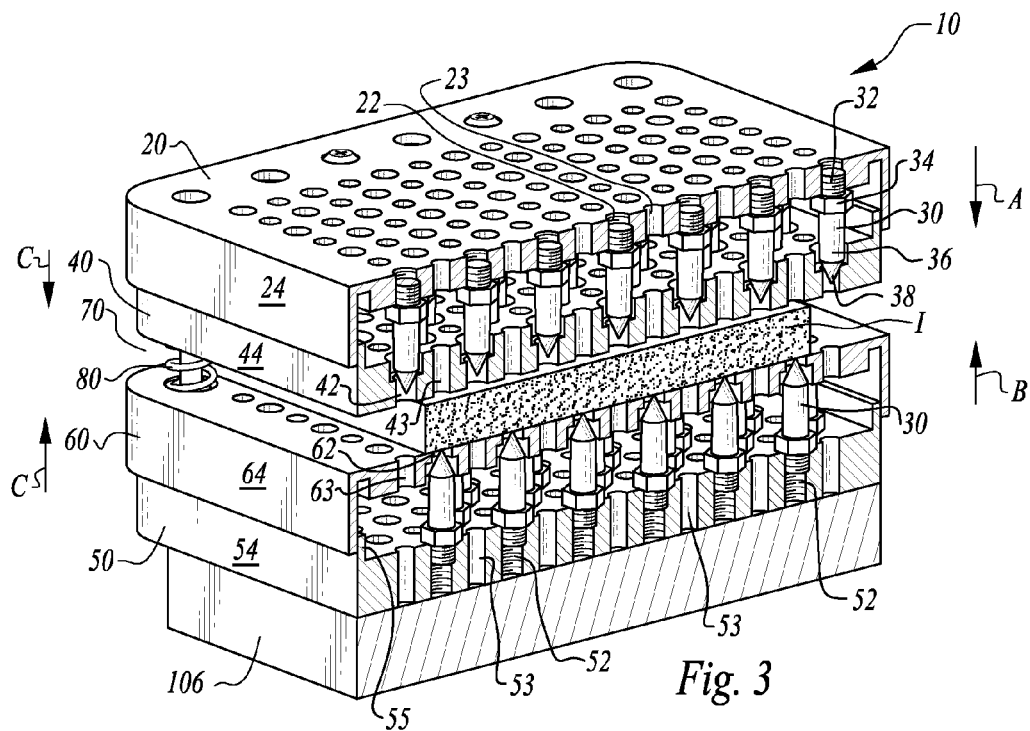
FIG. 3 is a perspective view similar to that which is shown in FIG. 1 but with portions cut away along a plane aligned with destruction pins extending from the drive platen and from the base platen.

More specifically, and with reference to FIGS. 1-3, in the exemplary embodiment the drive platen 20 is provided substantially parallel with and spaced from the base platen 50. These platens 20, 50, which provide preferred forms of movable upper and lower plates for this invention, are rigid substantially planar structures which are configured to move toward each other and away from each other (along arrow C), and toward and away from the gap 70 therebetween. The drive platen 20 has a lower surface facing the gap 70. An upper surface opposite the lower surface is available for application of a compressive force thereon from a downward force applicator, such as from the press driver 108 of the machine 100 (FIGS. 5 and 6).

Holes passing through (or at least into) the drive platen 20 include pin support holes 22 into which the destruction pins 30 are affixed, relief holes 23 to provide clearance for destruction pins 30 extending up from the base platen 50, clearance holes 26 and post holes 41. The clearance holes allow alignment posts 82 associated with gap springs 80 to pass up through the drive platen 20 when the gap 70 closes. The post holes 41 allow guide posts 47, which hold the top guard 40 to the drive platen 20, to pass up through the drive platen 20 when the top guard 40 retracts as the drive platen moves down into the gap 70 (along arrow A of FIGS. 1-3, 8 and 9).

The drive platen 20 has a perimeter wall 24 that defines the drive platen 20 as a generally orthorhombic structure. The perimeter wall 24 extends downward, covering perimeter groove 25 inboard of the wall 24. This groove 25 accommodates a perimeter tang 45 extending up from a perimeter side 44 of the top guard 40. The groove 25 and tang 45 coact to keep the top guard 40 aligned with the drive platen 20.

The top guard 40 is located adjacent a gap 70 side of the drive platen 20. This top guard 40 keeps destruction pins 30, which are fixed to the drive platen 20, covered in a form of sheath until the destruction process is underway. Similarly, a bottom guard 60 is provided over the base platen 50 which keeps destruction pins 30 fixed to the base platen 50 covered until the destruction force is applied. Relief holes 23, 43, 53, 63 are supplied in the drive platen 20, top guard 40, base platen 50 and bottom guard 60 so that the destruction pins 30 can extend through the guards 40, 60 and into the gap 70 and impact the item I to be destroyed.

The top guard 40 is preferably a planar rigid structure substantially parallel with and attached to the drive platen 20. This top guard 40 has primary holes 42 through which destruction pins 30 of the drive platen 20 can pass and secondary holes 43 through which destruction pins 30 of the base platen 50 can pass. A perimeter side 40 with tang 45 defines a perimeter of the top guard 40. The tang 45 keeps the top guard 40 aligned with the drive platen 20.

Guide posts 47 in the form of bolts thread into the top guard 40 and extend up through post holes 41 in the drive platen 20. Springs 46 surround some of the posts 47 and reside with ends in spring recesses 49 to bias the top guard 40 away from the drive platen 20.

With particular reference to FIG. 2, details of the destruction pins 30 and interior details of the overall destruction press 10 are shown. The pins 30 define a preferred form of teeth for impacting and destroying items I placed in the gap 70. The destruction pins 30 are preferably provided in two sets, one set affixed to the drive platen 20 and one set affixed to the base platen 50. In an alternative embodiment, only the drive platen 20 or the base platen 50 might be fitted with destruction pins 30. The destruction pins 30 on the drive platen 20 are positioned out of alignment with the destruction pins 30 in the base platen 50. Thus, while a series of rows and columns of holes 22, 23, 52, 53 are provided in the drive platen 20 and the base platen 50, alternating ones of these holes 22, 23, 52, 53 are either fitted with a destruction pin 30 or provided as a secondary relief hole for the destruction pins 30 of the other platen 50, 20. In this embodiment, the secondary relief holes 23, 53 are shown slightly smaller than the holes 22, 52 which are fitted with the destruction pins 30.

The destruction pins 30 are preferably screwed or press-fit into the holes 22, or are otherwise affixed to the drive platen 20. The destruction pins 30 preferably have a shoulder 34 thereon so that force associated with the destruction pins 30 driving down into the item I to be destroyed are distributed and carried by the drive platen 20. The destruction pins 30 are preferably formed of a hardened material having a greater hardness than other portions of the drive platen 20. A root 32 of each pin is preferably cylindrical and extends into the hole 22. A shaft 36 extends opposite the shoulder 34 along a centerline to a tip 38. The tip 38 is preferably pointed.

The construction of the destruction pins 30 is somewhat streamlined in nature to eliminate the potential for fracture which might otherwise occur for such hard materials when encountering high loads. The material forming the drive platen 20 is preferably similar to that of the base platen 50 and is a material which can be more readily machined, such as by drilling, to form the various relief holes 23, 53 and destruction pin 30 mounting holes 22, 52 exiting into (or through) the drive platen 20. In one embodiment, the drive platen 20 and the base platen 50 are formed of a moderately hard steel and the destruction pins 30 are formed of a high hardness steel.

With reference primarily to FIGS. 1-3 and 10, details of the base platen 50 and bottom guard 60 are described, according to this exemplary embodiment. The bottom guard 60 (defining one form of lower guard) is similar to the top guard 40, but is adjacent the base platen 50. The bottom guard 60 includes a perimeter wall 64 outboard of a perimeter grooves 65 which coact with a perimeter 54 of the base platen 50 and a perimeter tang 55 fitting within the perimeter groove 65, to keep the bottom guard 60 aligned with the base platen 50. Primary holes 62 and secondary holes 63 allow destruction pins 30 to pass therethrough. Also, springs 56 and guide posts 57, as well as spring recesses 59, are similar to the corresponding elements in the drive platen 20 and top guide 40, except that the guide posts 57 thread into or are otherwise affixed to the base platen 50 and post holes 51 are located in the bottom guard 60. This arrangement allows heads of the guide posts to extend up into the gap 70 at lateral edges thereof, so that the destruction press tool 10 can rest on a flat pedestal 106 with an item I in the gap 70 which is narrower than a spacing between front and rear rows of the guide posts 57.

Figure 10:
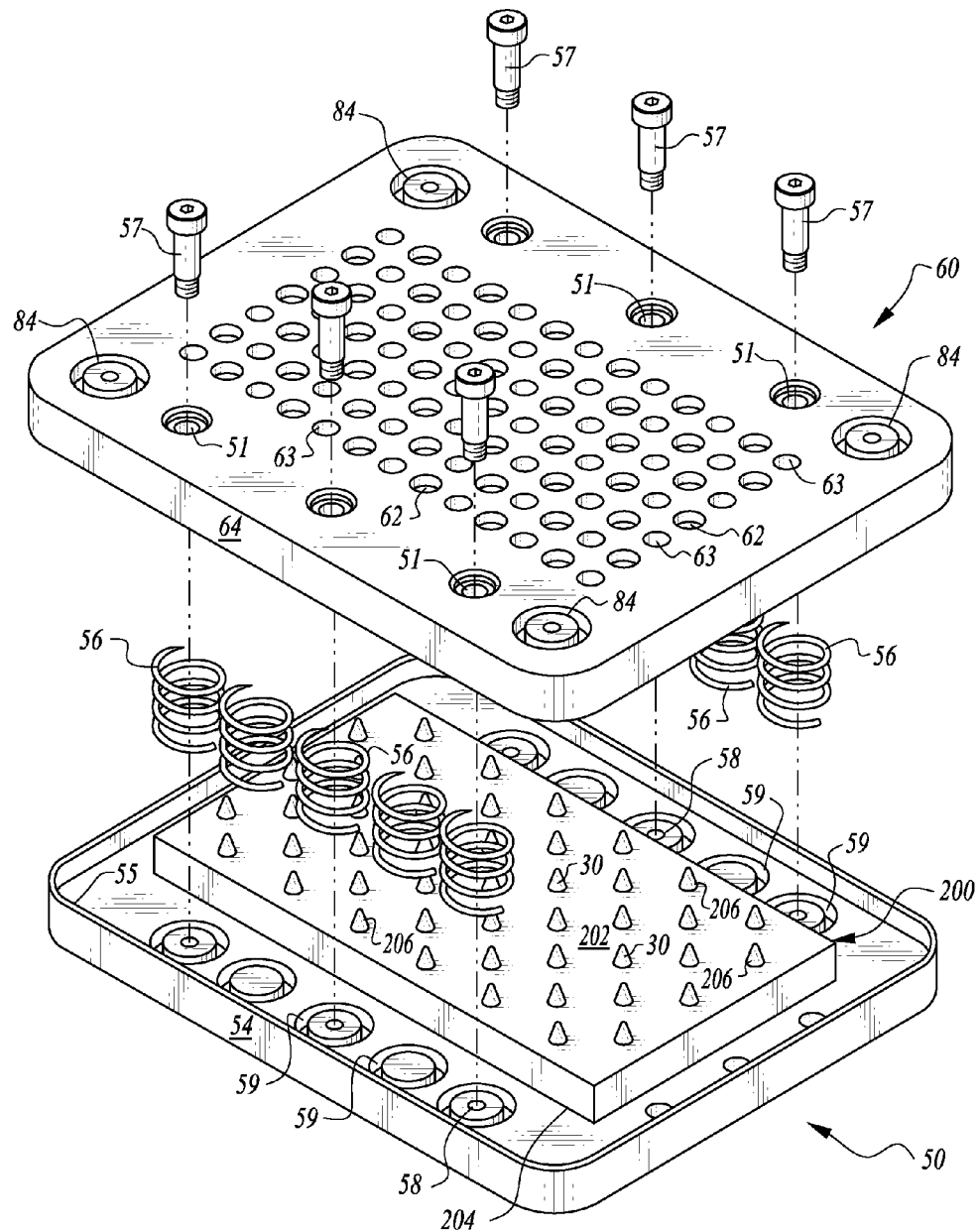
FIG. 10 is an exploded perspective view of the base platen and bottom guard in an embodiment that also shows foam between the platen and guard to keep debris out of internal workings of the destruction tool of this invention.

FIG. 10 shows that foam 200 can optionally be located between the base platen 50 and bottom guard 60. This foam 200 is preferably a planar sheet of open or closed cell hydrocarbon foam material or other organic material with a resilient nature. The foam 200 has a thickness between a top surface 202 and a bottom surface 204. Holes 206 pass through the foam to allow the pins 30 or other teeth to pass therethrough. The foam fills the space between the base platen 50 and the bottom guard 60 to help keep debris from entering this space, such as debris from crushing an item I to be destroyed. Similar foam can optionally be placed between the drive platen and the top guard if desired.

With particular reference to FIG. 3, details of the movement of the top guard 40 relative to the drive platen 20 and the bottom guard 60 relative to the base platen 50 are described, as well as bias springs 46, 56 and gap springs 80 to maintain desired placement for the drive platen 20 relative to the top guard 40 and base platen 50 relative to the bottom guard 60. In particular, bias springs 46 are interposed between the top guard 40 and the drive platen 20. These bias springs 40 are compression springs which keep the top guard 40 spaced down away from the drive platen 20 before use of the destruction press 10.

When a compression force is applied to the drive platen 20 downwardly, the drive platen 20 moves downward (along arrow A). This movement begins a process of gap 70 size reduction from a first size to a second size. The first size is typically about one centimeter, but could be altered to accommodate thicknesses of items I to be destroyed. The top guard 40 moves down with the drive platen 20 until the top guard 40 comes into contact with the item I to be destroyed, and that is located in the gap 70. The bias springs 46 can then be compressed and the top guard 40 ceases movement while the drive platen 20 continues moving downward (along arrow A). As this relative motion between the top guard 40 and drive platen 20 occurs, the destruction pins 30 begin to extend through holes 42 in the top guard 40 and come into contact with the item I to be destroyed.

At the same time as this action is occurring with the drive platen 20 and top guard 40, the item I to be destroyed is resting in the gap 70, upon the bottom guard 60 and above the base platen 50. When the top guard 40 comes into contact with the item I to be destroyed and the drive platen 20 continues moving downward, the bottom guard 60 moves relative to the base platen 50 so that relative to each other, the base platen 50 has the effect of moving its destruction pins 30 up through the holes 62 in the bottom guard 60 (along arrow B). The destruction pins 30 are fixed to the base platen 50 and extend up through these holes 62 and come into contact with the item I to be destroyed. Further application of this compression force causes the destruction pins 30 fixed to the drive platen 20 and the destruction pins 30 fixed to the base platen 50 to extend into the item I to be destroyed.

This movement continues to a significant depth into the item I to be destroyed, sufficient to fracture integrated circuits, buckle printed circuit boards, and otherwise destroy the operability of memory storage elements and other circuitry associated with the item I to be destroyed. Preferably, the destruction pins 30 associated with the drive platen 20 move past the destruction pins 30 associated with the base platen 50 at least partially. In one embodiment the pins 30 move past each other an amount greater than a pin height away form the platen 20, 50 to which they attach. In this way, and with this significant travel, these hardened destruction pins 30 extend into the item I to be destroyed so that no planar item within the gap 70 avoids this destructive force application by the destruction pins 30. Because the item I to be destroyed exhibits limited flexibility, based on the nature of materials from which it is manufactured, the force of these destruction pins 30 causes fracture, hole penetration, buckling and other destructive forces to be applied to the item I to be destroyed.

Once the bottom guard 60 and top guard 40 have bottomed out and the bias springs 46, 56 have been compressed their maximum amount, the drive platen 20 and base platen 50 move together to continue to close the gap 70 somewhat (along arrow C). While the top guard 40 and bottom guard 60 generally remain stationary, spaced apart by a width of an outer case or other upper and lower portions of the item I to be destroyed, the destruction pins 30 continue to penetrate into this item I as the drive platen 20 and base platen 50 move toward each other. Gap springs 80 are provided to maintain a height of the gap 70 for insertion and removal of items I to be destroyed. Alignment posts 82 and alignment grooves 84 to keep the springs 80 oriented properly between the top guard 40 and bottom guard 60 and keep the guards 40, 60 and their associated platens 20, 50 aligned as well.

As the compressing force is applied, these springs 80 can compress so that the top guard 40 and bottom guard 60 come into contact with an outer case or other part of the item I to be destroyed. By picking a strength of the gap springs 80 relative to the strength of the bias springs 46, 56, and by providing strategic numbers of such gap springs 80 and bias springs 46, 56, the operator can control whether the gap 70 will first be shortened in height or whether the top guard 40 and bottom guard 60 will move first relative to the drive platen 20 and base platen 50.

Figure 4:
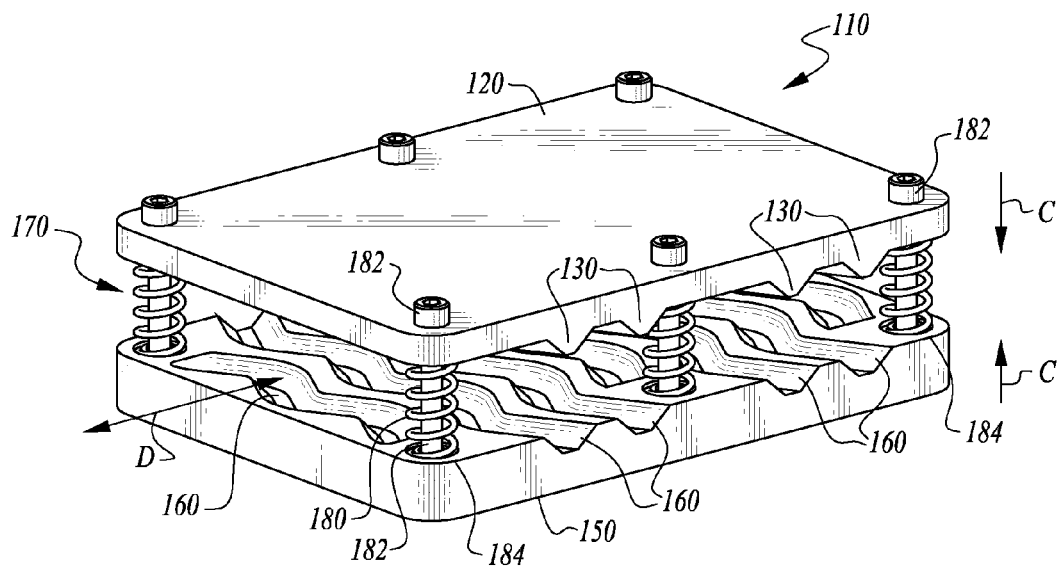
FIG. 4 is a perspective view of an alternative destruction press which exhibits ribs and channels rather than destruction pins extending into a gap thereof.
Figure 7:
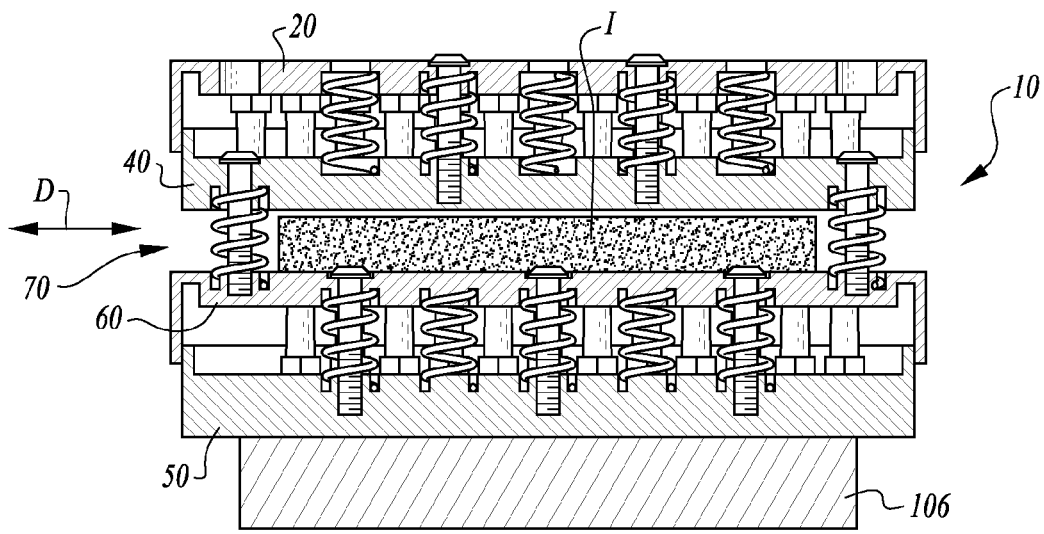
FIG. 7 is a front elevation full sectional view similar to that which is shown in FIG. 2 and cut along a plane similar to that exhibited in FIG. 2.
Figure 8:
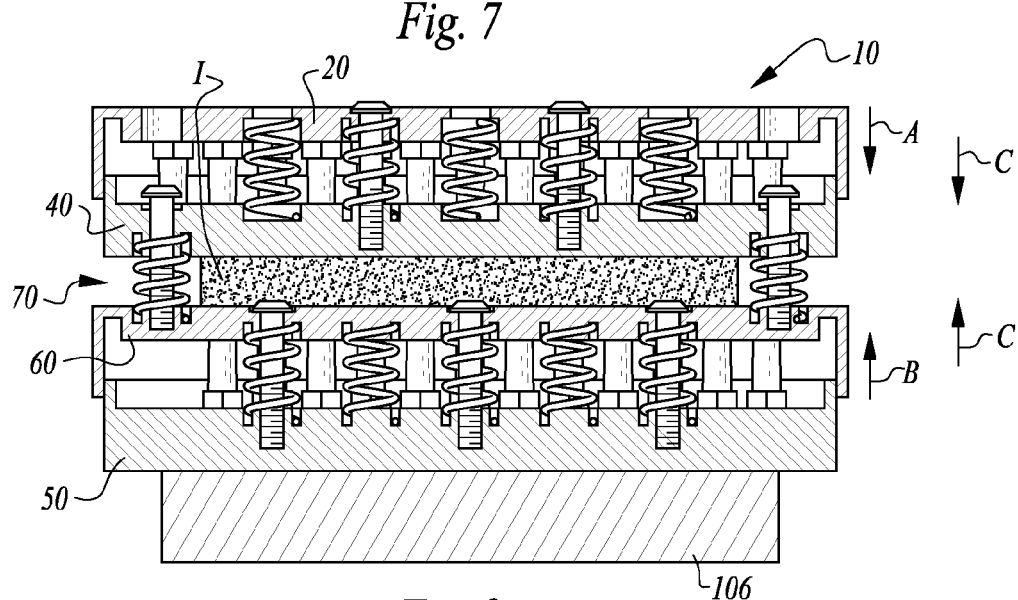
FIG. 8 is a front elevation full section view similar to that which is shown in FIG. 7, but after the gap has been partially closed so that the item is no longer free to move within the gap, but has been captured between the guards associated with the drive platen and the base platen.
Figure 9:
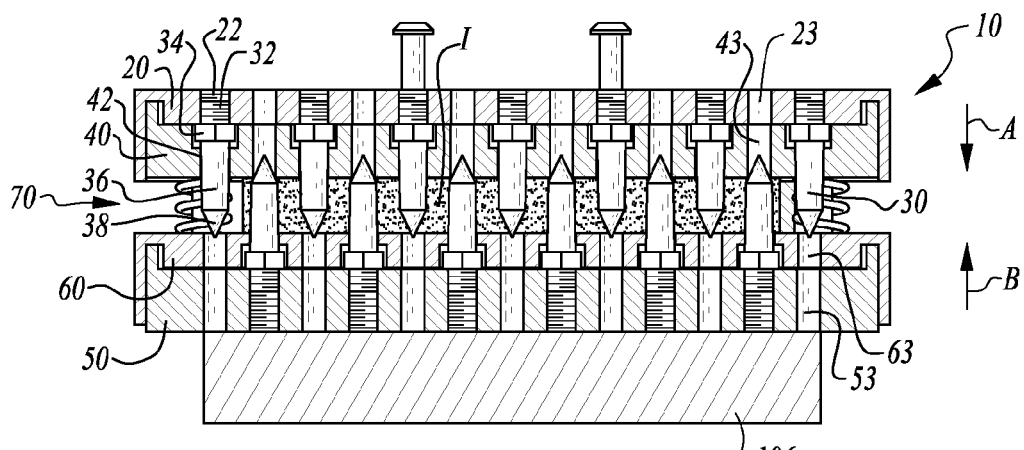
FIG. 9 is a front elevation view similar to that which is shown in FIG. 8, but after full collapsing of the gap to its second smaller size and with the guards collapsed against their associated drive platen and base platen, and with the destruction press cut along a plane similar to that exhibited in FIG. 3, passing through the destruction pins, illustrating how the destruction pins extend into and penetrate through the item to be destroyed.

With particular reference to FIG. 4, details of an alternative embodiment destruction press 110 are shown. With this alternate destruction press 110, a simplified variation is shown which does not include the top guard or bottom guard. Rather, a drive platen 120 and base platen 150 are provided which are spaced apart by a gap 170 and with gap springs 180 positioned therebetween, as well as alignment posts 182 and alignment grooves 184 adjacent each of the gap springs 180.

Surfaces of the drive platen 120 and base platen 150 (or other plates) which are adjacent each other, rather than being fitted with destruction pins, are provided with teeth in the form of destruction ribs 130. These ribs 130 are preferably provided in a complemental pattern so that the destruction ribs 130 in the drive platen 120 fit into destruction channels 160 between destruction ribs 130 in the base platen 150. An item I to be destroyed is inserted into the gap 170 and then a force is applied on the drive platen 120 relative to the base platen 150, causing the drive platen 120 and base platen 150 to be driven towards each other and for compression of the gap springs 180. The destruction ribs 130 extend into the item I to be destroyed, causing buckling and other cracking and fracture of the integrated circuits and other circuitry to be destroyed by the alternate destruction press 110.

FIG. 4 illustrates that the various embodiments of destruction presses of this invention can operate without the guards associated therewith, with the guards being optional, but beneficial, such as to enhance safety and to most easily facilitate passage of items into and out of the gap before and after use.

With particular reference to FIGS. 5 and 6, details of a destruction machine 100 are provided, with the destruction machine 100 being one type of machine which can apply the force needed to cause the drive platen 20 to be driven down against the base platen 50 for destruction of items I within the gap 70. The destruction press 10 is fitted therein and preferably visible through a window in an adjacent side wall or in the front (or rear) of a chamber 104 within a housing 102. The optional window can also act as a door through which items I to be destroyed can be placed. A press driver 108 configured as a drive bar has a press tip 109 which is located above the driven platen 20, and together define one form of downward force applicator. A drive screw or other force applicator (e.g. hydraulic cylinder, toggle press, etc.) is located above the press driver 108. The press driver 108 is powered by a rotating hub (when configured as a screw) at a top of the destruction machine 100 which is coupled through a belt 105 to an output drive of a motor 103. The assembly can be contained within a bellows 107 to keep the mechanism clean.

As the motor 103 operates, it can have gear reduction to increase force application and power transmitted from the motor 103 by the belt 105 to the drive screw or other press driver 108. When the press driver 108 is configured in the form of a drive screw, the drive screw is preferably an elongate shaft with outer threads thereon which act with a threaded shaft having inwardly facing threads therein. As the central shaft rotates, it applies a downward force on the hardened press tip 109 which impacts the drive platen 20 and is formed of a material which can handle the high forces associated with collapsing of the drive platen 20 onto the base platen 50 to destroy the item I within the gap 70. The threaded drive column can be driven both upwardly and downwardly and is preferably surrounded by a bellows 107 in the embodiment shown.

Other forms of machines could also be utilized to operate the destruction press 10. In one embodiment a tool such as a sledgehammer might be utilized and provide blows down on the drive platen 20 with the base platen 50 resting upon a high strength surface, and the destruction press 10 could thus be operated manually. For various different items to be destroyed, different amounts of force need to be applied. The destruction press 10 can be modified to provide the strength needed to provide the destruction force necessary for the items I the destruction press 10 is particularly designed to destroy. Similarly, the destruction machine 100 can be made more or less robust depending on the range of items I to be accommodated therein for destruction.

This disclosure is provided to reveal a preferred embodiment of the invention and a best mode for practicing the invention. Having thus described the invention in this way, it should be apparent that various different modifications can be made to the preferred embodiment without departing from the scope and spirit of this invention disclosure. When structures are identified as a means to perform a function, the identification is intended to include all structures which can perform the function specified. When structures of this invention are identified as being coupled together, such language should be interpreted broadly to include the structures being coupled directly together or coupled together through intervening structures. Such coupling could be permanent or temporary and either in a rigid fashion or in a fashion which allows pivoting, sliding or other relative motion while still providing some form of attachment, unless specifically restricted.

What is claimed is:

1. A media storage physical destruction tool, comprising in combination:
    an upper plate;
    said upper plate having a plurality of teeth extending from a lower surface of said upper plate;
    a lower plate;
    said upper plate and said lower plate spaced apart by a gap;
    said gap adjustable in size between a first size and a second size, with said first size larger than said second size;
    said first size configured to be larger than a length that said teeth extend from said upper plate, such that media storage can be placed into said gap when said gap exhibits said first size; and
    wherein said lower plate has a plurality of teeth extending up from an upper surface of said lower plate.

2. The destruction tool of claim 1 wherein relief holes are located extending into an upper surface of said lower plate, said relief holes aligned with said teeth extending from said upper plate; and
    wherein said second size of said gap is configured to be smaller than said length of said teeth, such that said teeth extend into said relief holes in said upper surface of said lower plate when said gap exhibits said second size.

3. The destruction tool of claim 1 wherein at least one gap spring is interposed between said upper plate and said lower plate, said gap spring oriented to bias said gap toward said first size for said gap.

4. The destruction tool of claim 1 wherein said teeth extending up from said upper surface of said lower plate are similar to said teeth extending from said lower surface of said upper plate, said teeth extending from said upper plate out of alignment with said teeth of said lower plate; and
    said first size of said gap larger than the length of both said teeth extending from said upper plate and said teeth extending from said lower plate.

5. The destruction tool of claim 4 wherein said upper plate includes relief holes extending into said lower surface, said relief holes extending into said lower surface of said upper plate aligned with said teeth extending down from said upper surface of said lower plate.

6. The destruction tool of claim 5 wherein said upper plate and said lower plate include support holes therein, said teeth each in the form of pins including a root sized to be press fit into one of said support holes in said upper plate or said lower plate, said pins including a shoulder having a size larger than said root and said support holes and with a shaft leading to a tip on a side of said shoulder opposite said root.

7. The destruction tool of claim 6 wherein said support holes and said relief holes in said upper plate exhibit an alternating pattern in two dimensions of a plane associated with said lower surface of said upper plate.

8. A media storage physical destruction tool, comprising in combination:
    an upper plate;
    said upper plate having a plurality of teeth extending from a lower surface of said upper plate;
    a lower plate;
    said upper plate and said lower plate spaced apart by a gap;
    said gap adjustable in size between a first size and a second size, with said first size larger than said second size;
    said first size configured to be larger than a length that said teeth extend from said upper plate, such that media storage can be placed into said gap when said gap exhibits said first size;
    wherein a guard is located within said gap adjacent said lower surface of said upper plate, said guard coupled to said upper plate; and
    said guard including holes passing therethrough, said holes in said guard aligned with said teeth extending from said lower surface of said upper plate, such that said teeth can pass through said holes in said guard.

9. The destruction tool of claim 8 wherein said guard has two positions relative to said upper plate with a first position orienting said guard below said teeth extending from said lower surface of said upper plate and a second position with said teeth extending from said lower surface of said upper plate passing through said holes in said guard.

10. The destruction tool of claim 9 wherein said lower plate has a plurality of teeth extending up from an upper surface of said lower plate;
    wherein said teeth extending up from said upper surface of said lower plate are similar to said teeth extending from said lower surface of said upper plate, said teeth extending from said upper plate out of alignment with said teeth of said lower plate;

said first size of said gap larger than the length of both said teeth extending from said upper plate and said teeth extending from said lower plate;

a lower guard located within said gap and adjacent said upper surface of said lower plate, said lower guard coupled to said lower plate, said lower guard including holes therein, said holes aligned with said teeth extending up from said upper surface of said lower plate; and said lower guard having a first position above said teeth and a second position with said teeth extending up from said upper surface of said lower plate passing through said holes in said lower guard.

11. The destruction tool of claim 1 wherein said teeth have a root opposite a tip, with said root wider than said tip.

12. The destruction tool of claim 11 wherein said teeth have pointed tips.

13. The destruction tool of claim 12 wherein said teeth are pins of cylindrical form press fit into holes in one of said plates with a shoulder on each pin larger than said press fit holes abutting one of said plates.

14. A media storage physical destruction tool, comprising in combination:
an upper plate;
said upper plate having a plurality of teeth extending from a lower surface of said upper plate;
a lower plate;
said upper plate and said lower plate spaced apart by a gap;
said gap adjustable in size between a first size and a second size, with said first size larger than said second size;
said first size configured to be larger than a length that said teeth extend from said upper plate, such that media storage can be placed into said gap when said gap exhibits said first size; and
wherein said teeth are in the form of elongate ribs, said elongate ribs extending substantially parallel with said lower surface of said upper plate.

15. The destruction tool of claim 14 wherein said lower plate includes channels therein extending into an upper surface of said lower plate, said channels aligned with said ribs in said lower surface of said upper plate.

16. A method for physical destruction of media storage item, including the steps of:
providing a press including an upper plate, the upper plate having a plurality of teeth extending from a lower surface of the upper plate, a lower plate, the upper plate and the lower plate spaced apart by a gap, the gap adjustable in size between a first size and a second size, with the first size larger than the second size and the first size configured to be larger than a length that the teeth extend from the upper plate, such that the media storage item can be placed into the gap when the gap exhibits the first size;
inserting a media storage item to be destroyed into the gap;
applying a compression force between the upper plate and the lower plate to close the gap and drive the teeth into the media storage item to be destroyed;
relieving the compression force to reopen the gap;
removing remains of the media storage item from the gap; and
wherein said identifying step includes the lower plate having a plurality of teeth extending up from an upper surface of the lower plate.

17. The method of claim 16 wherein said identifying step includes locating relief holes extending into an upper surface of the lower plate, the relief holes aligned with the teeth extending from the upper plate and the second size of the gap smaller than the length of the teeth, such that the teeth extend into the relief holes in the upper surface of the lower plate when the gap exhibits the second size.

18. The method of claim 16 wherein said identifying step includes at least one gap spring interposed between the upper plate and the lower plate, the gap spring oriented to bias the gap toward the first size for the gap.

19. The method of claim 16 wherein said identifying step includes the upper plate having relief holes extending into the lower surface, the relief holes aligned with the teeth extending up from the upper surface of the lower plate.

20. The method of claim 16 wherein said identifying step includes the teeth extending from the upper plate out of alignment with the teeth extending from the lower plate, and the first size of the gap larger than the length of both the teeth extending from the upper plate and the teeth extending from the lower plate.

21. A method for physical destruction of media storage item, including the steps of:
identifying a press including an upper plate, the upper plate having a plurality of teeth extending from a lower surface of the upper plate, a lower plate, the upper plate and the lower plate spaced apart by a gap, the gap adjustable in size between a first size and a second size, with the first size larger than the second size and the first size configured to be larger than a length that the teeth extend from the upper plate, such that the media storage item can be placed into the gap when the gap exhibits the first size;
inserting a media storage item to be destroyed into the gap;
applying a compression force between the upper plate and the lower plate to close the gap and drive the teeth into the media storage item to be destroyed;
relieving the compression force to reopen the gap;
removing remains of the media storage item from the gap;
wherein said identifying step includes a guard located within the gap adjacent the lower surface of the upper plate, the guard coupled to the upper plate and wherein the guard includes holes passing therethrough, the holes in the guard aligned with the teeth extending from the lower surface of the upper plate such that the teeth can pass through the holes in the guard.

22. A media storage physical destruction machine, comprising in combination:
an upper plate;
a lower plate;
said upper plate having a plurality of teeth extending therefrom;
said upper plate and said lower plate spaced apart by a gap;
said gap adjustable in size between a first size and a second size, with said first size larger than said second size;
said first size configured to be larger than a length that said teeth extend from said upper plate, such that an item to be destroyed can be placed into said gap when said gap exhibits said first size;
a force applicator applying a compression force between said upper plate and said lower plate; and
wherein said plurality of teeth extend from each of said plates, said teeth extending from said upper plate out of alignment with said teeth extending from said lower plate.

23. The machine of claim 22 wherein said machine further includes:
a chamber sized to have said plates located therein;

a pedestal within said chamber for supporting said lower plate of said tool resting thereon; and said force applicator in the form of a downward force applicator adapted to move down against the upper plate of the tool when the lower plate of the tool is resting upon said pedestal.

24. The machine of claim 23 wherein a door is provided into said chamber, said door located to allow items to access said gap within said tool, such that said door accommodates loading and removal of media storage items.

25. The machine of claim 22 wherein said second size for said gap between said plates is narrower than a length of said teeth extending from said upper plate plus a length of said teeth extending from said lower plate.

26. The machine of claim 22 wherein said teeth have a root opposite a tip, with said root wider than said tip.

27. The machine of claim 26 wherein said teeth are pins of cylindrical form press fit into holes in one of said plates with a shoulder on each pin larger than said press fit holes abutting one of said plates.

* * * * *